US012810457B2

(12) United States Patent
Sun et al.

(10) Patent No.: US 12,810,457 B2
(45) Date of Patent: Nov. 24, 2026

(54) METHOD AND DEVICE FOR OPTIMIZING THREE-DIMENSIONAL MAP DISPLAY

(71) Applicant: Beijing Roborock Innovation Technology Co., Ltd., Beijing (CN)

(72) Inventors: Jianbin Sun, Beijing (CN); Yuxuan Li, Beijing (CN); Yiming Cong, Beijing (CN)

(73) Assignee: Beijing Roborock Innovation Technology Co., Ltd., Beijing (CN)

( * ) Notice: Subject to any disclaimer, the term of this patent is extended or adjusted under 35 U.S.C. 154(b) by 162 days.

(21) Appl. No.: 18/725,350

(22) PCT Filed: Aug. 2, 2022

(86) PCT No.: PCT/CN2022/109800
§ 371 (c)(1),
(2) Date: Jun. 28, 2024

(87) PCT Pub. No.: WO2023/124085
PCT Pub. Date: Jul. 6, 2023

(65) Prior Publication Data

US 2025/0061599 A1 Feb. 20, 2025

(30) Foreign Application Priority Data

Dec. 31, 2021 (CN) ......................... 202111678459.3

(51) Int. Cl.
*G06T 7/62* (2017.01)
*G06T 15/10* (2011.01)

(52) U.S. Cl.
CPC ................ *G06T 7/62* (2017.01); *G06T 15/10* (2013.01)

(58) Field of Classification Search
CPC ........... G06T 7/62; G06T 15/10; G06T 19/00; G06T 2200/04; G06T 2200/24;
(Continued)

(56) References Cited

U.S. PATENT DOCUMENTS

2011/0166783 A1 7/2011 Ren et al.
2015/0354979 A1* 12/2015 Cengil .............. G01C 21/3682 701/532

FOREIGN PATENT DOCUMENTS

CN 105796002 A 7/2016
CN 107767382 A * 3/2018 ............ G06T 17/05
(Continued)

OTHER PUBLICATIONS

Bell et al. View Management for Virtual and Augmented Reality [Online]. Nov. 11, 2001 [Retrieved on Jun. 30, 2026]. Retrieved from the Internet: <URL: https://dl.acm.org/doi/pdf/10.1145/502348.502363 > (Year: 2001).*

(Continued)

*Primary Examiner* — King Y Poon
*Assistant Examiner* — Michelle Hau Ma
(74) *Attorney, Agent, or Firm* — Thomas Horstemeyer, LLP

(57) ABSTRACT

The present disclosure provides a method and an apparatus for optimizing 3D map display, which relate to the field of map data processing technologies, and mainly aim at solving the problem that the existing 3D map has a poor display effect. The method includes: acquiring map data of a working region; analyzing the map data to acquire a first region set and a second region set, where the first region set contains one or more passable regions for a robot, and the second region set contains one or more impassable regions for the robot; determining a display height corresponding to each region in the second region set respectively by using a preset height algorithm; and displaying the working region in a 3D map according to the display height. The present disclosure is mainly used for 3D map display.

17 Claims, 5 Drawing Sheets

(58) Field of Classification Search
CPC .. G01C 21/20; G01C 21/383; G01C 21/3833; G06F 16/29
See application file for complete search history.

(56) References Cited

FOREIGN PATENT DOCUMENTS

| | | | | | |
|---|---|---|---|---|---|
| CN | 111190419 | A | | 5/2020 | |
| CN | 111248815 | A | * | 6/2020 | .............. A47L 11/24 |
| CN | 111514582 | A | * | 8/2020 | ............. G06T 17/05 |
| CN | 111521184 | A | | 8/2020 | |
| CN | 112539749 | A | | 3/2021 | |
| CN | 112837412 | A | * | 5/2021 | ............. G06T 17/05 |
| CN | 113686301 | A | | 11/2021 | |
| CN | 113686347 | A | | 11/2021 | |
| CN | 114610820 | A | | 6/2022 | |
| JP | 2000-105814 | A2 | | 4/2000 | |
| JP | 2001-209301 | A | | 8/2001 | |
| JP | 2004-294615 | A2 | | 10/2004 | |
| JP | 2004294615 | A | * | 10/2004 | |
| JP | 2006-048070 | A2 | | 2/2006 | |
| JP | 2009-217363 | A | | 9/2009 | |
| JP | 2014182671 | A | * | 9/2014 | ........... G09B 29/106 |
| JP | 2014-186569 | A | | 10/2014 | |
| JP | 2018-513416 | A | | 5/2018 | |
| JP | 2021-523445 | A | | 9/2021 | |
| WO | 2020077850 | A1 | | 4/2020 | |
| WO | 2020248458 | A1 | | 12/2020 | |

OTHER PUBLICATIONS

JP2024-539283—1st Office Action with English mailed Jul. 1, 2025.
First Office Action in Application No. 2021111678459.3.
CN202111678459.3—Decision of Rejection.

* cited by examiner

METHOD AND DEVICE FOR OPTIMIZING THREE-DIMENSIONAL MAP DISPLAY

CROSS-REFERENCE TO RELATED APPLICATION(S)

This application is a 35 U.S.C. 371 national phase application of PCT International Application No. PCT/CN2022/109800 filed on Aug. 2, 2022, which claims priority of the Chinese Patent Application No. 202111678459.3, filed on Dec. 31, 2021, the whole disclosure of both are incorporated herein by reference in their entireties.

TECHNICAL FIELD

The present disclosure relates to the field of map data processing technologies, in particular to a method and an apparatus for optimizing three-dimensional (3D) map display.

BACKGROUND ART

With the development of computer technologies and artificial intelligence, robot research and development has gained wide attention, and positioning and map creation are hot issues in the field of autonomous mobile robots. The robot may start moving from an unknown location in an unknown environment, achieve localization itself according to position estimation and sensor data during the movement, and build a map at the same time. The map built by the robot may be displayed to users through a mobile terminal device for the users to learn about a working situation and a working environment of the robot. Therefore, how to present an intuitive and highly visible map to the users has become an urgent problem.

SUMMARY OF THE INVENTION

In view of above, the present disclosure provides a method and an apparatus for optimizing 3D map display, which mainly solve the existing problem of poor display effect of a 3D map.

According to one aspect of the present disclosure, a method for optimizing 3D map display is provided. The method includes:

acquiring map data of a working region;

analyzing the map data to acquire a first region set and a second region set, where the first region set contains one or more passable regions for a robot, and the second region set contains one or more regions impassable for the robot;

determining a display height corresponding to each region in the second region set respectively by using a preset height algorithm; and displaying the working region in a 3D map according to the display height.

According to another aspect of the present disclosure, an apparatus for optimizing 3D map display is provided. The apparatus includes:

an acquisition module, configured to acquire map data of a working region;

an analysis module, configured to analyze the map data to acquire a first region set and a second region set, where the first region set contains one or more passable regions for a robot, and the second region set contains one or more regions impassable for the robot;

a determination module, configured to determine a display height corresponding to each region in the second region set respectively by using a preset height algorithm; and a display module, configured to display the working region in a 3D map according to the display height.

According to yet another aspect of the present disclosure, a storage medium is provided. The storage medium has at least one executable instruction stored therein, where the executable instruction causes a processor to execute operations corresponding to the above method for optimizing 3D map display.

According to still a further aspect of the present disclosure, a terminal is provided. The terminal includes: a processor, a memory, a communication interface, and a communication bus, where the processor, the memory, and the communication interface communicate with each other through the communication bus; and the memory is configured to store at least one executable instruction, where the executable instruction causes the processor to execute operations corresponding to the above method for optimizing 3D map display.

The above descriptions are only an overview of the technical solutions of the present disclosure, and may be implemented according to contents of the description in order to understand the technical means of the present disclosure more clearly. In order to make the above and other objectives, features, and advantages of the present disclosure more obvious and understandable, the following are specific embodiments of the present disclosure.

BRIEF DESCRIPTION OF THE DRAWINGS

Various other advantages and benefits will become clear to those of ordinary skill in the art by reading the following detailed descriptions of preferred embodiments. The accompanying drawings are only for the purpose of illustrating preferred embodiments, and are not considered as limiting the present disclosure. Moreover, the same parts are denoted by the same reference signs throughout the accompanying drawings. In the drawings.

DETAILED DESCRIPTION

Figure 1:
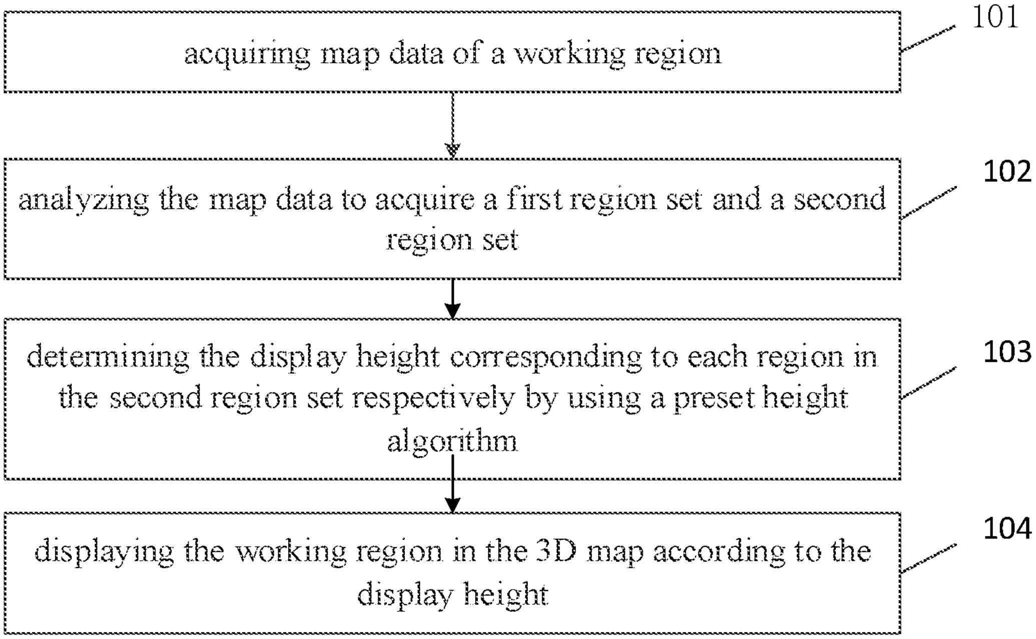
FIG. 1 shows a flowchart of a method for optimizing 3D map display according to an embodiment of the present disclosure.

Exemplary embodiments of the present disclosure will be described in more detail below with reference to the accompanying drawings. Although exemplary embodiments of the present disclosure are shown in the drawings, it should be understood that the present disclosure may be implemented in various forms and should not be limited by the embodiments set forth herein. On the contrary, these embodiments are provided for a more thorough understanding of the present disclosure, and will fully convey the scope of the present disclosure to those skilled in the art.

At present, when a map built by a robot is displayed in three dimensions, the height of a wall in the map is fixed. As a result, due to the fixed height being too large of the wall in some maps, the wall will block other regions in the maps, leading to the failure for the user to clearly view situations in the maps. While in some other maps, the 3D effect is not obvious due to the fixed height being too small of the wall, which also affects the user to view the maps, leading to the problem of a poor display effect of the existing 3D map.

Aiming at the problem that the existing 3D map has a poor display effect due to the above situations, an embodiment of the present disclosure provides a method for optimizing 3D map display. As shown in FIG. 1, the method includes the following steps.

In step 101, map data of a working region is acquired.

The map data is collected and generated by a mobile robot in the working region. The working region may be a family room, a restaurant, a mine, etc., which is not specifically limited by the embodiments of the present application.

It should be noted that the existing mobile robots have a plurality of built-in sensors inside. Based on these sensors, the robots can collect perceptive information about a working environment, extract abstract geometric features (such as line segments or curves) corresponding to objects in the environment from the information, and generate a map corresponding to the working environment in combination with these geometric features and positioning data. In an embodiment of the present application, the map data in this step may be acquired and generated by the mobile robot by patrolling and traversing in the working environment. Alternatively, the map data in the current working environment may be directly acquired by using a data interface or from a third party. This is not specifically limited by the embodiments of the present application.

In step 102, the map data is analyzed to acquire a first region set and a second region set.

The first region set contains one or more passable regions for a robot, and the second region set contains one or more impassable regions for the robot. The passable region may be a flat road surface or an obstacle that the robot can avoid; while the impassable region may be an obstacle such as a wall and a furniture, which is not specifically limited by the embodiments of the present application.

In an embodiment of the present disclosure, this step may determine whether a certain region belongs to the first region set or the second region set by analyzing geometric features corresponding to respective elements contained in the map and attributes of respective elements in the map according to the received map data. Besides, region identification information corresponding to each region may be configured in each region set, so as to identify that the robot is passable in the region corresponding to the identification information in the set. For example, the first region set may include region identification information, such as living room, master bedroom, and No. 1 exhibition hall. The second region set may include region identification information such as No. 1 furniture, No. 2 wall, and stairs, so as to identify that the mobile robot is impassable in the region corresponding to the identification information and needs avoidance. Also, corresponding display heights may be respectively configured according to the identification information while displaying the 3D map.

In step 103, the display height respectively corresponding to each region in the second region set is determined by using a preset height algorithm.

Specifically, the preset height algorithm described in this step may be determined according to an area of each region, or in combination with an overall area of the current working region of the robot, or in combination with the area size of each sub-region in the current working region of the robot. That is, if there are two passable regions and three impassable regions in the current working region of the robot, and while determining the display heights of these three impassable regions, the display heights of respective regions in the second region set may be determined according to the area sizes and/or area ratios of these five sub-regions. But, the embodiments of the present disclosure are not limited thereto.

It should be noted that in the existing 3D map display solution, no matter how large the actual area identified in the current map is, the display heights of the obstacles such as walls in the map are fixed while displaying the 3D map. For example, there is an indoor support wall in the second region set of a certain family indoor map, and the actual size of the wall is 10 m long, 0.5 m wide, and 3.5 m high. There is also a trash can in the second region set, and the actual size of the trash can is 0.3 m long, 0.1 m wide, and 0.5 m high. When the support wall and the trash can are displayed with the same display height of 1 m, a display body of the trash will block other regions in a family indoor 3D map, and a stereoscopic display effect of the support wall is not obvious enough. However, according to the embodiments of the present application, different regions may be configured to be displayed at different display heights according to a certain algorithm. For example, the above family indoor map may be displayed according to a display height of 3 m for the wall and a display height of 0.4 m for the trash can, so as to improve the display effect of the 3D map.

In step 104, the working region is displayed in the 3D map according to the display height.

The display height may be the respective size value in the map or may be the actual size. When the value identified by the display height is the actual size, it may be converted according to a map ratio and displayed in the 3D map according to an acquired conversion result.

In the present application, after the display height of each region is determined, the 3D map is configured to be displayed according to the determined display height value. The specific display method may be a method for displaying a 3D map in the relevant art, which will not be repeated in detail here by the embodiments of the present application.

The present disclosure provides a method and an apparatus for optimizing 3D map display, a storage medium, and a terminal. Compared with the relevant art, in the embodiments of the present disclosure, the map data of the working region is acquired; the map data is analyzed to acquire the first region set and the second region set, where the first region set contains one or more passable for the robot, and the second region set contains one or more impassable regions for the robot; the display height corresponding to each region in the second region set is determined respectively by using the preset height algorithm; and the working region is displayed according to the display height in the 3D map. The display heights respectively corresponding to respective impassable regions in the map are determined according to a certain height calculation method, and the impassable regions are displayed in the 3D map according to the configured display heights. This helps to avoid the problem of poor display effect of the 3D map caused by displaying all impassable regions according to the only determined display height, thereby improving the display effect of the 3D map.

Figure 2:
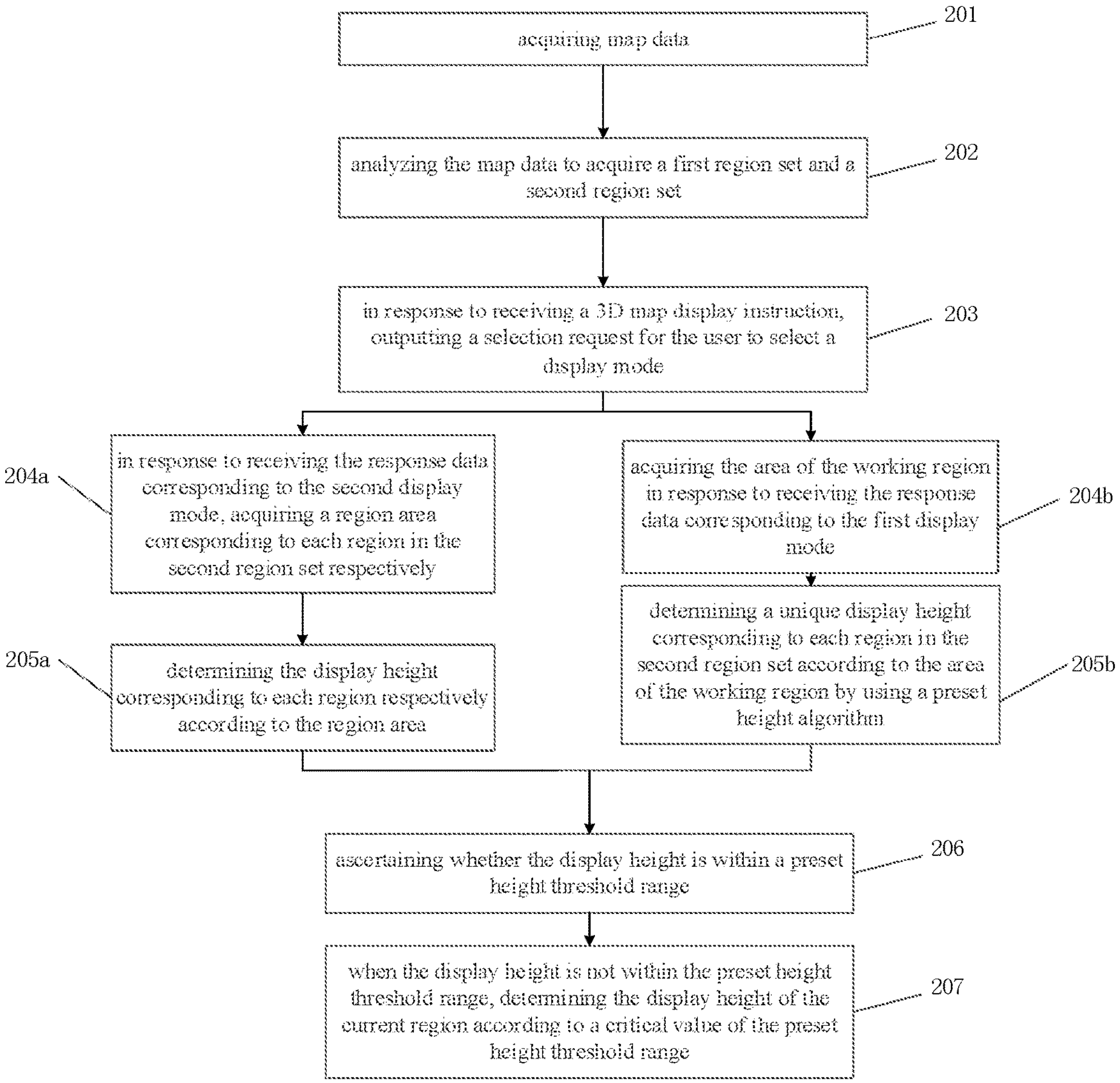
FIG. 2 shows a flowchart of another method for optimizing 3D map display according to an embodiment of the present disclosure.

Further, as a refinement and extension of the specific implementation of the above embodiment, in order to fully explain the specific implementation process of the present embodiment, another method for optimizing 3D map display is provided. As shown in FIG. 2, the method includes the following steps.

In step 201, map data of a working region is acquired.

The map data is collected and generated by a mobile robot in the working region.

It should be noted that the existing mobile robots can scan and collect external environment data according to their own worn sensors, laser rangefinders, or the like, and extract several features therefrom to generate map data for representing an external environment. The map data may be stored in the robot for operation, autonomous obstacle avoidance, and the like according to the map data during the operation of the robot. The map data may also be uploaded to a server or a mobile terminal device for a user to use and view a working region of the robot, and the like.

In step 202, the map data is analyzed to acquire a first region set and a second region set.

The first region set contains one or more passable regions for the robot, and the second region set contains one or more impassable regions for the robot. Specifically, the concept explanation and specific implementation described in this step may refer to the corresponding description in step 202, which will not repeated here in detail by the embodiments of the present application.

In step 203, in response to receiving a 3D map display instruction, a selection request is outputted for the user to select a display mode.

The display mode includes a first display mode and a second display mode. The first display mode is a mode where the display height is determined based on an overall area of the working region, and the second display mode is a mode where the display height is determined based on the area of each region in the working region. Specifically, in the first display mode, only one display height value needs to be confirmed according to a total occupied area of the current working region, and the display height of each region in the second region set is configured by using this display height value. While in the second display mode, the display height of each region in the second region set needs to be respectively determined according to the area of each region in the second region set. Obviously, compared with the second mode, the map display based on the first mode has less data processing amount and higher display efficiency, but has a slightly poor display effect. Therefore, different display modes are provided in the embodiments of the present application for selection by the user according to his own needs, so that the use experience of the user is improved while the display effect of the 3D map can be ensured.

The 3D map display instruction may be sent by the user through a touch display screen, e.g., by clicking a "3D display" icon in the map, or operating the touch display screen by the user through a preset gesture. Then, the 3D map display instruction may be triggered to be sent to the mobile robot, so that the mobile robot outputs the selection request in this step after receiving the map display instruction. Specifically, the selection request may be outputted in the form of a window or text, and response data is returned after selection by the user through the touch screen. But, the embodiments of the present disclosure are not limited thereto.

In step 204*a*, in response to receiving the response data corresponding to the second display mode, a region area corresponding to each region in the second region set is acquired respectively.

The region area is an occupied area of the region in a plane map. The region area corresponding to each region in the plane map involved in this step may be calculated according to the acquired map data, and the calculated area value may be an actual area or a size occupied in the map, which is not specifically limited by the embodiments of the present application.

In step 205*a*, the display height corresponding to each region is determined respectively according to the region area.

The display height may be a respective size value in the map or may be an actual size. When the value identified by the display height is the actual size, it may be converted according to a map ratio and displayed in the 3D map according to an acquired conversion result.

According to an embodiment of the present application, the step 205*a* includes: determining the display height corresponding to each region respectively according to an area range corresponding to the region area and a first mapping relationship between the area range and the display height; or, determining a product of an area of each region and a first preset coefficient as the display height of each region.

The display height in this step may be divided according to the area range, or calculated separately for each interval range. When a confirmation for the display height is based on range mapping, firstly, the range is determined to which the range area of the display height to be determined belongs, and then the display height corresponding to the range of the display height to be determined is acquired according to the range and the mapping relationship. The first preset coefficient may be set according to different application scenarios. Thus, when the region area is multiplied by this coefficient to acquire the display height, it is only necessary to ensure that the display height and the region area are positively correlated. That is, the larger the region area, the larger the display height value in the 3D map; while the smaller the region area, the smaller the display height value in the 3D map.

In the embodiments of the present application, no matter which calculation method for the display height is adopted, the display height corresponding to the region area can be determined according to the region area, so that the display height is directly proportional to the region area to a certain extent. That is, the larger the region, the higher the respective display height, while the smaller the region, the lower the respective display height. Besides, since the region area is large when the display height is large, other regions will not be blocked while performing 3D display. Thus, the problem of blocking between different regions can be avoided while a stereoscopic display effect is ensured, thereby ensuring the display effect of the 3D map.

In step 204*b*, which is parallel to step 204*a*, the area of the working region is acquired in response to receiving the response data corresponding to the first display mode.

According to the description in step 203 above, the first display mode is a mode where the overall area of the current working region of the robot is determined. Thus, in response to receiving the response data after the user selects the first display mode, the overall area of the current working region of the robot is acquired, so as to determine the display height of each region in the second region set of the working region according to the overall area.

In step 205*b*, a unique display height corresponding to each region in the second region set is determined according to the area of the working region by using a preset height algorithm.

In another display height algorithm for each region in the second region set according to an embodiment of the present application, since the display height is determined according to the overall area of the working region, the display height of the impassable region in the whole working region can be calculated according to the area of the working region and a certain algorithm, and the display height of each impassable region is identical.

According to an embodiment of the present application, step 205*b* includes: determining the unique display height corresponding to each region in the second region set according to an area range corresponding to the area of the working region and a second mapping relationship between the area range and the display height.

Alternatively, step 205*b* includes: determining a product of the area of the working region and a second preset coefficient as the unique display height corresponding to each region in the second region set.

Specifically, the unique display height corresponding to each region in this step may be acquired by mapping according to the area range to which the area of the current working region belongs, or calculated according to the total area of the working region. When the confirmation for the display height is based on range mapping, firstly, the range is determined to which the area of the working region belongs, and then the display height corresponding to each region in the second region set of the working region is acquired according to the range and the mapping relationship, where the display height corresponding to each region in the second region set is identical. The second preset coefficient may be set according to different application scenarios. Thus, when the display height is acquired by multiplying the area of the working region by this coefficient, it is only necessary to ensure that the display height and the area of the working region are positively correlated. That is, the larger the area of the working region, the larger the display height value of the impassable region in the working region in the 3D map; while the smaller the area of the working region, the smaller the display height value of the impassable region in the working region in the 3D map.

In step 206, it is ascertained whether the display height is within a preset height threshold range.

The preset height threshold may be set according to specific application scenarios. For example, corresponding limit values may be set according to different region areas, or the preset height threshold described in this step may be determined in combination with use experience, which is not specifically limited by the embodiments of the present application.

In step 207, when the display height is not within the preset height threshold range, the display height of the current region is determined according to a critical value of the preset height threshold range.

Specifically, when the calculated display height is less than a minimum value in the preset threshold range, the minimum value in the preset threshold range is determined as the current display height. When the calculated display height is greater than a maximum value in the preset threshold range, the maximum value in the preset threshold range is determined as the current display height.

In the embodiments of the present application, by setting the preset height threshold and correcting the calculated display height in response to ascertaining that the calculated display height is not within a preset height range, the problem of poor display effect, which is caused by the calculated display height value being too large or too small while calculating the display height of the impassable region according to the region area, is avoided, thereby further improving the display effect of the 3D map.

The present disclosure provides a method and an apparatus for optimizing 3D map display, a storage medium, and a terminal. Compared with the relevant art, in the embodiments of the present disclosure, the map data is acquired, collected, and uploaded by the mobile robot in the working region; the map data is analyzed to acquire the first region set and the second region set, where the first region set contains one or more passable regions for the robot, and the second region set contains one or more impassable regions for the robot; the display height corresponding to each region in the second region set is determined respectively by using the preset height algorithm; and the working region is displayed according to the display height in the 3D map. The display heights respectively corresponding to respective impassable regions in the map are determined according to a certain height calculation method, and the impassable regions are displayed in the 3D map according to the configured display heights. This helps to avoid the problem of poor display effect of the 3D map caused by displaying all impassable regions according to the only determined display height, thereby improving the display effect of the 3D map.

Figure 3:
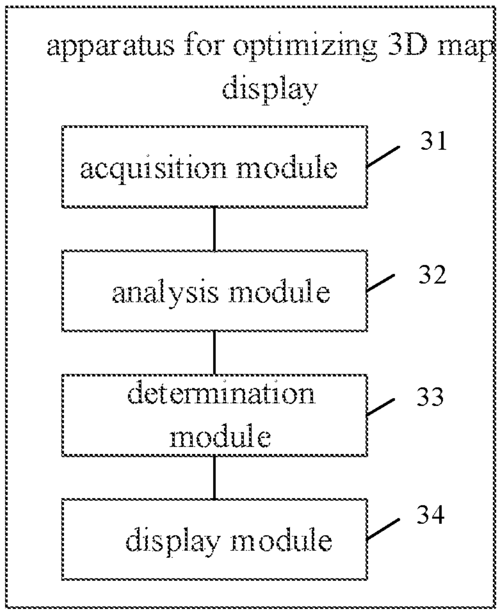
FIG. 3 shows a block diagram of an apparatus for optimizing 3D map display according to an embodiment of the present disclosure.

Further, as an implementation of the method shown in FIG. 1 above, an embodiment of the present application provides an apparatus for optimizing 3D map display. As shown in FIG. 3, the apparatus includes an acquisition module 31, an analysis module 32, a determination module 33, and a display module 34.

The acquisition module 31 is configured to acquire map data of a working region, where the map data is collected and uploaded by a mobile robot in the working region.

The analysis module 32 is configured to analyze the map data to acquire a first region set and a second region set, where the first region set contains one or more passable regions for a robot, and the second region set contains one or more regions impassable for the robot.

The determination module 33 is configured to determine a display height corresponding to each region in the second region set respectively by using a preset height algorithm.

The display module 34 is configured to display the working region in a 3D map according to the display height.

Figure 4:
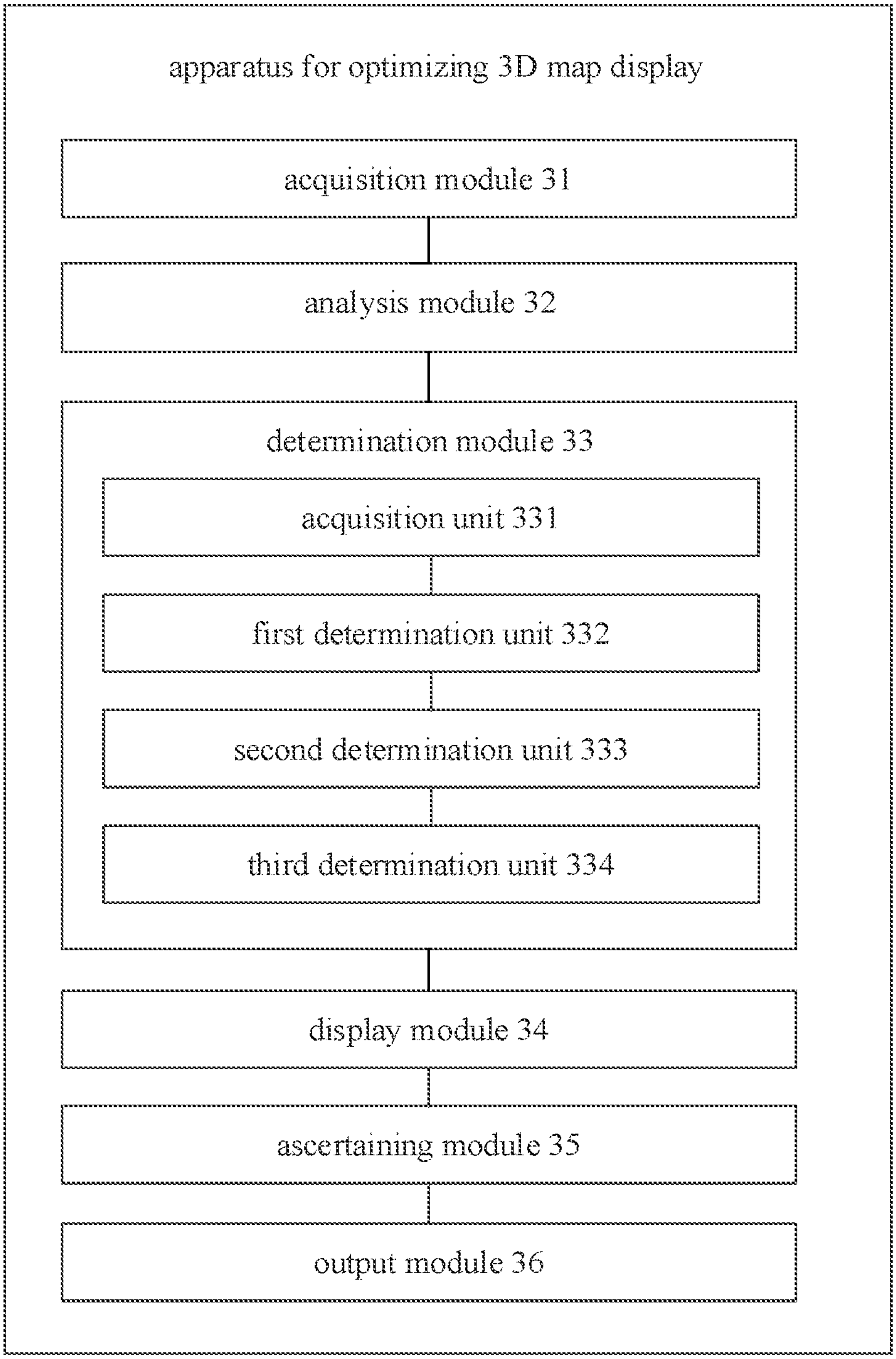
FIG. 4 shows a block diagram of another apparatus for optimizing 3D map display according to an embodiment of the present disclosure.

Further, as shown in FIG. 4, the determination module 33 includes:

- an acquisition unit 331, configured to acquire a region area corresponding to each region in the second region set respectively, where the region area is an occupied area of the region in a plane map; and
- a first determination unit 332, configured to determine the display height corresponding to each region according to the region area respectively.

Further, as shown in FIG. 4, the first determination unit 332 is further configured to determine the display height corresponding to each region respectively according to an area range corresponding to the region area and a first mapping relationship between the area range and the display height.

The first determination unit 332 is further configured to determine a product of an area of each region and a first preset coefficient as the display height of each region.

Further, as shown in FIG. 4, the apparatus further includes an ascertaining module 35.

The ascertaining module 35 is configured to ascertain whether the display height is within a preset height threshold range.

The determination module 33 is further configured to determine a display height of a current region according to a critical value of the preset height threshold range when the display height is not within the preset height threshold range.

Further, as shown in FIG. 4, the apparatus further includes an output module 36.

The output module 36 is configured to output a selection request for a user to select a display mode in response to receiving a 3D map display instruction. The display mode contains a second display mode, and the second display mode is a mode where the display height is determined based on the area of each region in the working region.

The determination module 33 is specifically configured to determine the display height corresponding to each region in the second region set respectively by using the preset height algorithm in response to receiving response data corresponding to the second display mode.

Further, as shown in FIG. 4, the output module 36 is further configured to output the selection request for the user to select the display mode in response to receiving the 3D map display instruction. The display mode contains a first display mode, and the first display mode is a mode where the display height is determined based on an overall area of the working region.

Further, as shown in FIG. 4, the acquisition module 31 is further configured to acquire an area of the working region in response to receiving response data corresponding to the first display mode.

The determination module 33 is specifically further configured to determine a unique display height corresponding to each region in the second region set according to the area of the working region by using the preset height algorithm.

Further, as shown in FIG. 4, the determination module 33 further includes:

- a second determination unit 333, configured to determine the unique display height corresponding to each region in the second region set according to an area range corresponding to the area of the working region and a second mapping relationship between the area range and the display height; and
- a third determination unit 334, configured to determine a product of the area of the working region and a second preset coefficient as the unique display height corresponding to each region in the second region set.

The present disclosure provides a method and an apparatus for optimizing 3D map display, a storage medium, and a terminal. Compared with the relevant art, in the embodiments of the present disclosure, the map data of the working region is acquired; the map data is analyzed to acquire the first region set and the second region set, where the first region set contains one or more passable for the robot, and the second region set contains one or more impassable regions for the robot; the display height corresponding to each region in the second region set is determined respectively by using the preset height algorithm; and the working region is displayed according to the display height in the 3D map. The display heights respectively corresponding to respective impassable regions in the map are determined according to a certain height calculation method, and the impassable regions are displayed in the 3D map according to the configured display heights. Thus, this helps to avoid the problem of poor display effect of the 3D map caused by displaying all impassable regions according to the only determined display height, thereby improving the display effect of the 3D map.

According to an embodiment of the present disclosure, a storage medium is provided. The storage medium has at least one executable instruction stored therein. The computer executable instruction may execute the method for optimizing 3D map display in any of the above method embodiments.

Figure 5:
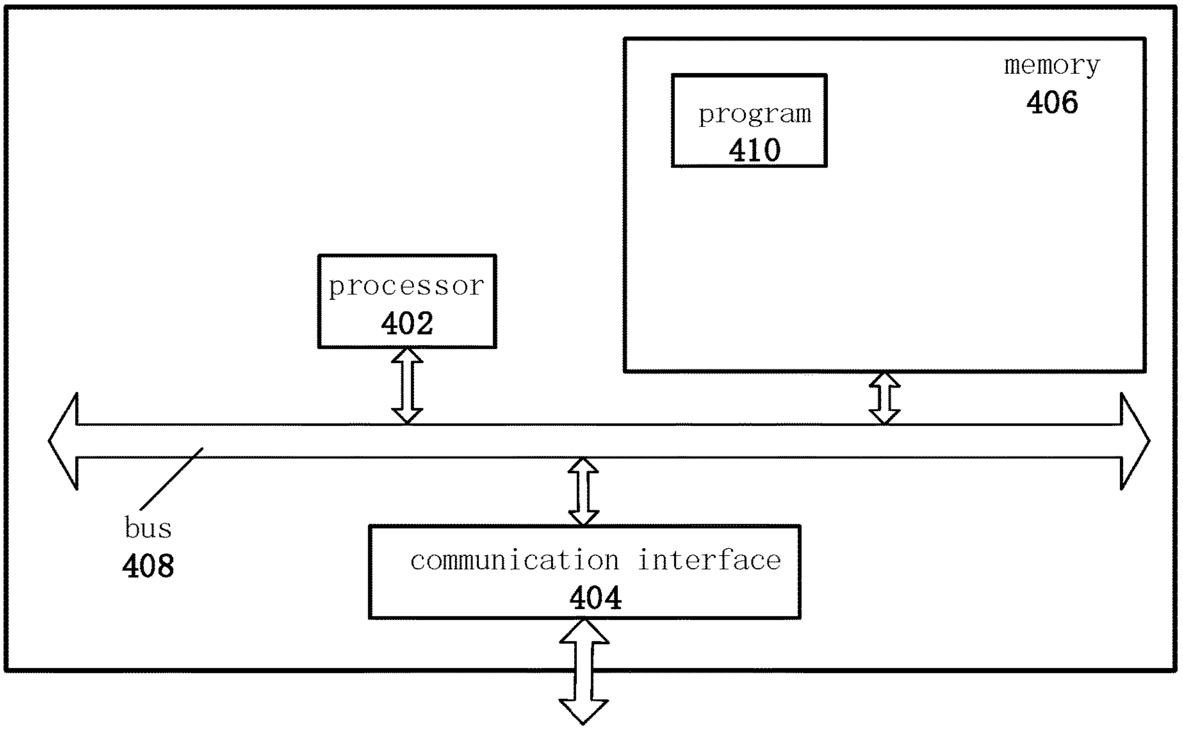
FIG. 5 shows a schematic structural diagram of a terminal according to an embodiment of the present disclosure.

FIG. 5 shows a schematic structural diagram of a terminal according to an embodiment of the present disclosure, and the specific embodiment of the present disclosure does not limit the specific implementation of the terminal.

As shown in FIG. 5, the terminal may include a processor 402, a communication interface 404, a memory 406, and a communication bus 408.

The processor 402, the communication interface 404, and the memory 406 communicate with each other through the communication bus 408.

The communication interface 404 is configured to communicate with network elements of other devices, such as clients or other servers.

The processor 402 is configured to execute a program 410, and may specifically execute the relevant steps in the above embodiments of the method for optimizing 3D map display.

Specifically, the program 410 may include program codes, where the program codes include computer operation instructions.

The processor 402 may be a central processing unit (CPU), or an application specific integrated circuit (ASIC), or one or more integrated circuits configured to implement the embodiments of the present disclosure. One or more processors included in the terminal may be the same type of processors, such as one or more CPUs, and may also be different types of processors, such as one or more CPUs and one or more ASICs.

The memory 406 is configured to store the program 410. The memory 406 may include a high-speed RAM memory, or may also include a non-volatile memory, such as at least one disk memory.

The program 410 may be specifically configured to cause the processor 402 to execute the following operations:

- acquiring map data of a working region;
- analyzing the map data to acquire a first region set and a second region set, where the first region set contains one or more passable regions for a robot, and the second region set contains one or more regions impassable for the robot;
- determining a display height corresponding to each region in the second region set respectively by using a preset height algorithm; and
- displaying the working region in a 3D map according to the display height.

Obviously, those skilled in the art should understand that the above modules or steps of the present disclosure may be implemented by general computing apparatuses, and may be centralized on a single computing apparatus or distributed over a network composed of a plurality of computing apparatuses. Optionally, they may be implemented by program codes executable by the computing apparatuses, so that they can be stored in storage apparatuses and executed by the computing apparatuses. In some cases, the steps shown or described may be executed in a different order from the description here, or may be respectively manufactured into respective integrated circuit modules, or a plurality of modules or steps may be manufactured into a single integrated circuit module. As such, the present disclosure is not limited to any particular combination of hardware and software.

Described above are merely preferred embodiments of the present disclosure, and are not intended to limit the present disclosure. For those skilled in the art, the present disclosure may have various alterations and variations. Within the spirit and principle of the present disclosure, any modifications, equivalent substitutions, improvements, and the like are within the protection scope of the present disclosure.

What is claimed is:

1. A method for optimizing three-dimensional (3D) map display, comprising:

acquiring map data of a working region;

analyzing the map data to acquire a first region set and a second region set, wherein the first region set contains one or more passable regions for a robot, and the second region set contains one or more impassable regions for the robot;

determining a display height corresponding to each region in the second region set respectively by using a preset height algorithm; and displaying the working region in a 3D map according to the display height;

wherein after determining the display height corresponding to each region in the second region set respectively by using the preset height algorithm, the method further comprises:

ascertaining whether the display height is within a preset height threshold range; and determining a display height of a current region according to a critical value of the preset height threshold range when the display height is not within the preset height threshold range;

wherein determining the display height of the current region according to the critical value of the preset height threshold range comprises:

determining a minimum value of the preset height threshold range as the display height of the current region when the display height is less than the minimum value; and determining a maximum value of the preset height threshold range as the display height of the current region when the display height is greater than the maximum value.

2. The method according to claim 1, wherein the determining the display height corresponding to each region in the second region set respectively by using the preset height algorithm comprises:

acquiring a region area corresponding to each region in the second region set respectively, wherein the region area is an occupied area of the region in a plane map; and determining the display height corresponding to each region respectively according to the region area.

3. The method according to claim 2, wherein the determining the display height corresponding to each region in the second region set respectively according to the region area comprises:

determining the display height corresponding to each region respectively according to an area range corresponding to the region area and a first mapping relationship between the area range and the display height; or determining a product of an area of each region and a first preset coefficient as the display height of each region.

4. The method according to claim 1, wherein after analyzing the map data to acquire the first region set and the second region set, the method further comprises:

outputting a selection request for a user to select a display mode, in response to receiving a 3D map display instruction, wherein the display mode contains a second display mode, and the second display mode is a mode where the display height is determined based on an area of each region in the working region; and the determining the display height corresponding to each region in the second region set respectively by using the preset height algorithm comprises:

determining the display height corresponding to each region in the second region set respectively by using the preset height algorithm, in response to receiving response data corresponding to the second display mode.

5. The method according to claim 4, wherein the method further comprises:

outputting the selection request for the user to select the display mode, in response to receiving the 3D map display instruction, wherein the display mode contains a first display mode, and the first display mode is a mode where the display height is determined based on an overall area of the working region; and the determining the display height corresponding to each region in the second region set respectively by using the preset height algorithm comprises:

acquiring an area of the working region in response to receiving response data corresponding to the first display mode; and determining a unique display height corresponding to each region in the second region set according to the area of the working region by using the preset height algorithm.

6. The method according to claim 5, wherein the determining the unique display height corresponding to each region in the second region set according to the area of the working region by using the preset height algorithm comprises:

determining the unique display height corresponding to each region in the second region set according to an area range corresponding to the area of the working region and a second mapping relationship between the area range and the display height; or determining a product of the area of the working region and a second preset coefficient as the unique display height corresponding to each region in the second region set.

7. A non-transitory storage medium, having at least one executable instruction stored therein, wherein the executable instruction causes a processor to execute operations corresponding to a method for optimizing 3D map display, wherein the method comprises:

acquiring map data of a working region;

analyzing the map data to acquire a first region set and a second region set, wherein the first region set contains one or more passable regions for a robot, and the second region set contains one or more impassable regions for the robot;

determining a display height corresponding to each region in the second region set respectively by using a preset height algorithm; and displaying the working region in a 3D map according to the display height;

wherein after determining the display height corresponding to each region in the second region set respectively by using the preset height algorithm, the method further comprises:

ascertaining whether the display height is within a preset height threshold range; and determining a display height of a current region according to a critical value of the preset height threshold range when the display height is not within the preset height threshold range;

wherein determining the display height of the current region according to the critical value of the preset height threshold range comprises:

determining a minimum value of the preset height threshold range as the display height of the current region when the display height is less than the minimum value; and determining a maximum value of the preset height threshold range as the display height of the current region when the display height is greater than the maximum value.

8. The non-transitory storage medium according to claim 7, wherein the determining the display height corresponding to each region in the second region set respectively by using the preset height algorithm comprises:

acquiring a region area corresponding to each region in the second region set respectively, wherein the region area is an occupied area of the region in a plane map; and determining the display height corresponding to each region respectively according to the region area.

9. The non-transitory storage medium according to claim 8, wherein the determining the display height corresponding to each region in the second region set respectively according to the region area comprises:

determining the display height corresponding to each region respectively according to an area range corresponding to the region area and a first mapping relationship between the area range and the display height; or determining a product of an area of each region and a first preset coefficient as the display height of each region.

10. The non-transitory storage medium according to claim 7, wherein after analyzing the map data to acquire the first region set and the second region set, the method further comprises:

outputting a selection request for a user to select a display mode, in response to receiving a 3D map display instruction, wherein the display mode contains a second display mode, and the second display mode is a mode where the display height is determined based on an area of each region in the working region; and the determining the display height corresponding to each region in the second region set respectively by using the preset height algorithm comprises:

determining the display height corresponding to each region in the second region set respectively by using the preset height algorithm, in response to receiving response data corresponding to the second display mode.

11. The non-transitory storage medium according to claim 10, wherein the method further comprises:

outputting the selection request for the user to select the display mode, in response to receiving the 3D map display instruction, wherein the display mode contains a first display mode, and the first display mode is a mode where the display height is determined based on an overall area of the working region; and the determining the display height corresponding to each region in the second region set respectively by using the preset height algorithm comprises:

acquiring an area of the working region in response to receiving response data corresponding to the first display mode; and determining a unique display height corresponding to each region in the second region set according to the area of the working region by using the preset height algorithm.

12. A terminal, comprising: a processor, a memory, a communication interface, and a communication bus, wherein the processor, the memory, and the communication interface communicate with each other through the communication bus; and the memory is configured to store at least one executable instruction, and the executable instruction causes the processor to execute operations corresponding to a method for optimizing 3D map display, wherein the method comprises:

acquiring map data of a working region;

analyzing the map data to acquire a first region set and a second region set, wherein the first region set contains one or more passable regions for a robot, and the second region set contains one or more impassable regions for the robot;

determining a display height corresponding to each region in the second region set respectively by using a preset height algorithm; and displaying the working region in a 3D map according to the display height;

wherein after determining the display height corresponding to each region in the second region set respectively by using the preset height algorithm, the method further comprises:

ascertaining whether the display height is within a preset height threshold range; and determining a display height of a current region according to a critical value of the preset height threshold range when the display height is not within the preset height threshold range;

wherein determining the display height of the current region according to the critical value of the preset height threshold range comprises:

determining a minimum value of the preset height threshold range as the display height of the current region when the display height is less than the minimum value; and determining a maximum value of the preset height threshold range as the display height of the current region when the display height is greater than the maximum value.

13. The terminal according to claim 12, wherein the determining the display height corresponding to each region in the second region set respectively by using the preset height algorithm comprises:

acquiring a region area corresponding to each region in the second region set respectively, wherein the region area is an occupied area of the region in a plane map; and determining the display height corresponding to each region respectively according to the region area.

14. The terminal according to claim 13, wherein the determining the display height corresponding to each region in the second region set respectively according to the region area comprises:

determining the display height corresponding to each region respectively according to an area range corresponding to the region area and a first mapping relationship between the area range and the display height; or determining a product of an area of each region and a first preset coefficient as the display height of each region.

15. The terminal according to claim 12, wherein after analyzing the map data to acquire the first region set and the second region set, the method further comprises:

outputting a selection request for a user to select a display mode, in response to receiving a 3D map display instruction, wherein the display mode contains a second display mode, and the second display mode is a mode where the display height is determined based on an area of each region in the working region; and the determining the display height corresponding to each region in the second region set respectively by using the preset height algorithm comprises:

determining the display height corresponding to each region in the second region set respectively by using the preset height algorithm, in response to receiving response data corresponding to the second display mode.

16. The terminal according to claim 15, wherein the method further comprises:

outputting the selection request for the user to select the display mode, in response to receiving the 3D map display instruction, wherein the display mode contains a first display mode, and the first display mode is a mode where the display height is determined based on an overall area of the working region; and the determining the display height corresponding to each region in the second region set respectively by using the preset height algorithm comprises:

acquiring an area of the working region in response to receiving response data corresponding to the first display mode; and determining a unique display height corresponding to each region in the second region set according to the area of the working region by using the preset height algorithm.

17. The terminal according to claim 16, wherein the determining the unique display height corresponding to each region in the second region set according to the area of the working region by using the preset height algorithm comprises:

determining the unique display height corresponding to each region in the second region set according to an area range corresponding to the area of the working region and a second mapping relationship between the area range and the display height; or determining a product of the area of the working region and a second preset coefficient as the unique display height corresponding to each region in the second region set.

* * * * *